US009527574B2

(12) United States Patent
Steger et al.

(10) Patent No.: US 9,527,574 B2
(45) Date of Patent: Dec. 27, 2016

(54) AIRCRAFT WITH INTEGRATED JETTISON MECHANISM

(71) Applicant: AIRBUS HELICOPTERS DEUTSCHLAND GMBH, Donauworth (DE)

(72) Inventors: Justus Steger, Neustadt A.D. Aisch (DE); Stefan Gorlich, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 367 days.

(21) Appl. No.: 14/217,853

(22) Filed: Mar. 18, 2014

(65) Prior Publication Data

US 2014/0259935 A1    Sep. 18, 2014

(30) Foreign Application Priority Data

Mar. 18, 2013   (EP) .................................... 13400004

(51) Int. Cl.
  B64C 1/32    (2006.01)
  B64C 1/14    (2006.01)
(52) U.S. Cl.
  CPC .............. B64C 1/32 (2013.01); B64C 1/1423 (2013.01); B64C 1/1461 (2013.01)
(58) Field of Classification Search
  CPC ...... B64C 1/1423; B64C 1/143; B64C 1/1461; B64C 1/32
  See application file for complete search history.

(56) References Cited

U.S. PATENT DOCUMENTS

| 3,131,892 A | 5/1964 | Salmun |
| 3,851,845 A | 12/1974 | Edwards |
| 6,341,748 B1 * | 1/2002 | Brooks ................. B64C 1/1407 244/129.5 |
| 6,427,383 B1 | 8/2002 | Brooks et al. |
| 2004/0104306 A1 * | 6/2004 | Pautis ................... B64C 1/1484 244/129.3 |
| 2012/0085865 A1 | 4/2012 | Gorgoglione |

FOREIGN PATENT DOCUMENTS

WO        9819908      5/1998

OTHER PUBLICATIONS

Extended European Search Report for EP 13400004.1, Completed by the European Patent Office, Dated Jul. 31, 2013, 6 Pages.

* cited by examiner

*Primary Examiner* — Nicholas McFall
(74) *Attorney, Agent, or Firm* — Brooks Kushman P.C.

(57) ABSTRACT

An aircraft (1) with jettison mechanism, particularly a helicopter, comprising an airframe (2), at least one door (5) movably mounted to the airframe (2), at least one door lock mechanism (9) at an interface of said at least one door (5) with the airframe (2) to releasable mount the at least one door (5) relative to the airframe (2) and actuation means (11) for the at least one door lock mechanism (9). An emergency jettison button (20, 38) is integrated into handles (11, 12) of said actuation means.

20 Claims, 3 Drawing Sheets

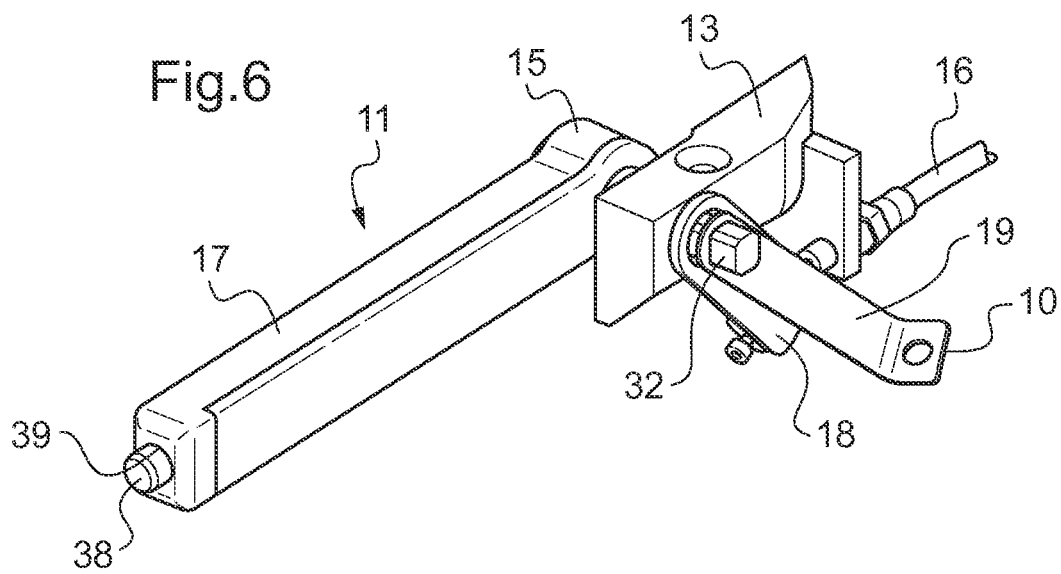
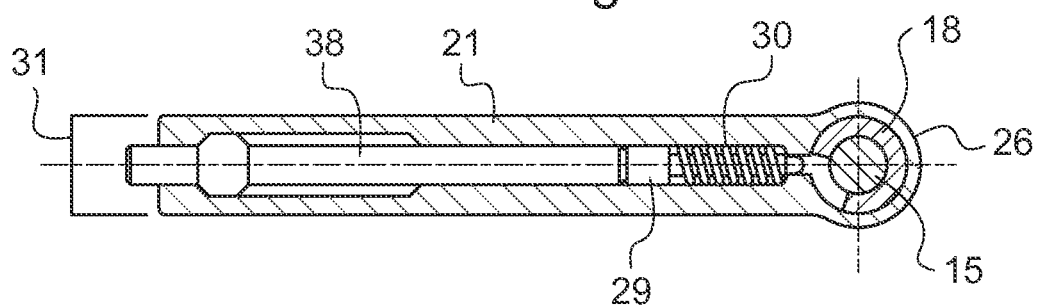

AIRCRAFT WITH INTEGRATED JETTISON MECHANISM

CROSS REFERENCE TO RELATED APPLICATION

This application claims priority to European patent application No. EP 13400004.1, filed on Mar. 18, 2013, the content of which is incorporated in its entirety by reference herein.

BACKGROUND OF THE INVENTION (1) Field of the Invention

The invention relates to an aircraft with a jettison mechanism.

(2) Description of Related Art

After an accident it is important for all occupants of an aircraft to be able to leave the aircraft quickly. Due to deformation of the airframe as a consequence of the accident the doors may be jammed and it may not be possible to open the doors in a normal way to exit the occupants.

A large exit from the aircraft can be achieved by jettisoning the door from the aircraft by severing all connections of the door to the airframe. A large exit is particularly advantageous if elements, such as backrests of seats project into windows to be used as emergency exits, thus reducing the available cross section for egress by such windows emergency exits.

Door lock mechanisms, e.g. a door lock mechanism of a door of an aircraft, are so arranged, that when the door arm of said door lock mechanism is disconnected, the door will not separate as long as the door lock mechanism is closed. If the door is jettisoned with the door lock mechanism closed the door can be blocked against the fuselage. Therefore the design has to ensure that the jettisoning and unlocking of the door has to be done at the same time.

The document U.S. Pat. No. 3,131,892 describes a door latch assembly for aircraft and helicopters. A closure member for an access opening is secured in completely closed and open positions, but also in a variety of intermediate position. The closure member may be completely removed or jettisoned. When in a generally horizontal position, a cam follower unit makes the door being constrained against reciprocate opening/closing movement. Into another position it effects relative movement between the various sections of a carrier assembly and the unit in the opposite directions, thereby releasing the carrier assembly from frictional engagement with walls of a channel. This permits the door to be reciprocated along the fuselage between. When it is desired to remove the door for jettisoning, a first handle is displaced beyond a limit defined by an abutment element, by rotating a stop lever, distinct and distant from the handle, to remove the abutment element from the path of the handle. Cam followers are completely withdrawn from respective cam slots so that the door is free to fall, since the only forces active on the door which tend to prevent such fall are imparted thereto through an interconnection of the assembly and unit now disengaged.

The document US 2012/085865 describes a door assembly for a helicopter. The door assembly has a post; a door fitted to the post by a first and a second hinge, so as to rotate about a hinge axis to open and close a door opening. An emergency release device has a release handle, and a stem which extends through the post along a release axis substantially perpendicular to the hinge axis, rotates axially, in response to operation of the release handle, from a first to a second angular position to detach the door from the post, and is fixed at one axial end to the first hinge; the release handle being connected to the stem to rotate together with the stem about its release axis.

The document U.S. Pat. No. 6,341,748 discloses an emergency exit system for use primarily in a helicopter or other aircraft. Said emergency exit system includes a panel closing an opening in the fuselage of the aircraft, a plurality of latches for releasably securing the panel in the opening; a release mechanism including slides on each side of the opening for retracting the latches to release the panel; a drive for operating the slides, a drive latch for releasably locking the drive in a cocked condition; and a plurality of principal grab bars strategically located in notches adjacent to the opening and connected to the drive by cables, whereby actuation of any one of the grab bars causes simultaneous release of all of the latches so that the panel can be jettisoned.

The document U.S. Pat. No. 6,427,383 discloses an emergency exit system for use on a helicopter or other aircraft. Said emergency exit system includes a frame defining an opening for receiving a panel to close the opening; a plurality of latches for releasably securing the panel in the opening; a plurality of release mechanisms; a cable extending around at least a major portion of the frame for releasing the panel; and a plurality of actuators strategically located around the opening and connected to the cable, whereby actuation of any one of the actuators causes simultaneous release of all of the latches so that the panel can be jettisoned.

The document EP 0935556 discloses an emergency egress system for facilitating emergency egress of passengers/crewmembers from an aircraft. Said egress system includes an egress panel, a panel frame disposed about the egress panel and a weather strip defining back-to-back channels for accepting the peripheral edges of the egress panel and the panel frame. Furthermore, the emergency egress system includes a plurality of retention devices disposed about the periphery of the egress panel for laterally retaining the egress panel with respect to the panel frame in a normal operating mode, a cam means operative to forcibly urge a portion of the weather strip out of engagement with one of the peripheral edges and an actuation means operative to sequentially disengage at least one of the retention devices and actuate the cam means in an emergency operating mode. Following actuation, a passenger/crewmember may detach the egress panel from the panel frame.

The U.S. Pat. No. 3,851,845 relates to an aperture closure device incorporating a quick release mechanism adapted for incorporation in an aircraft door to effect jettisoning of the door in an emergency. The device includes a plurality of separable hinges operated by a single lever from within the aircraft which can further incorporate means for simultaneously releasing the normal door closing mechanism, thereby effecting complete release of the door by operation of the single lever incorporating a quick release mechanism.

BRIEF SUMMARY OF THE INVENTION

One of the causes of confusion after civilian and military helicopter accidents is that occupants have difficulty locating the jettison mechanism and, if they do find it, they experience difficulty operating it in the right sequence.

A technical problem of the invention is to provide an aircraft with a jettison mechanism for jettisoning of a door with an existing door lock mechanism. A further technical problem of the invention is to simplify door operation and to provide a jettison able aircraft door without the disadvantages of the prior art.

A solution is provided with an aircraft with a jettison mechanism with the features of claim 1 of the invention. Embodiments of the invention are presented in the dependent claims.

An aircraft, particularly a helicopter, with jettison mechanism, comprises an airframe and at least one door connected with connection means, e.g. at least one guide arm and/or hinges, to said airframe. The connection means movably mount said at least one door to compatible supports, e.g., guide rails, integral with the airframe. At least one door lock mechanism is provided at an interface of said at least one door with the airframe to releasable hold the at least one door relative to the airframe.

Further provided are actuation means, preferably a handle, to open or close the at least one door lock mechanism, to subsequently allow movement of said at least one door guided relative to the airframe by the connection means. Further provided is an emergency button integrated into the actuation means. The actuation means are connected to the at least one door lock mechanism and are optionally connected to the connection means. At least parts of the connection means are operable to allow separation of said at least one door from the compatible supports.

Upon actuation of said emergency button the actuation means are connected mechanically to the jettison mechanism. Subsequently separation of the connection means from the supports of the at least one door to sever said at least one door from the airframe while releasing at the same time the at least one door lock mechanism is effected upon actuation of the actuation means with the mechanically locked emergency button of the jettison mechanism. The aircraft arms the jettison mechanism for its associated at least one door by means of said emergency button integrated with the actuation means and optionally linked to the connection means.

The actuation means operate the door lock mechanism and with the emergency button pushed as well the connection means to sever the at least one door entirely from the airframe at less time and without causing confusion for any person attempting to escape through the at least one door from the inside of the airframe. To jettison at least one closed door of the aircraft, two actions with said integrated emergency button and the actuation means are needed: first pressing said emergency button integrated into the actuation means and then jettisoning the at least one door by actuating the actuation means, whereas according to the state of the art the disengagement of the locking devices for a closed door is followed by a separate disconnection of the other connecting elements through a second handle or handles. The aircraft with a jettison mechanism with one separate handle satisfies the safety requirements with at least two different actions necessary to sever the door. The integrated emergency button and the actuation means of the inventive aircraft are mounted on the door for an integrated construction of the mechanical connections particularly suitable for operating a sliding door.

The elements for the jettisoning are all located in one actuation means/handle, thereby limiting the time needed to find them in an emergency.

There is no need to change the grip on handles during the jettison procedure.

Intuitively the occupants will try to open the door with the handles and the inventive arrangement is suitable to draw the occupants' attention to the integrated emergency button for jettison.

The normal door opening mechanism is used to disconnect several of the elements connecting door and airframe.

No cluttering of the door with several handles or other similar elements.

To jettison the door the passenger has to use only one handle simplifying and accelerating the jettison procedure.

Confusion is reduced by using one clearly identifiable actuation device which actuates all necessary mechanisms.

In an embodiment of the invention the integrated emergency button is behind a quick remove cover to prevent accidental actuation of the integrated emergency button.

In an embodiment of the invention the integrated emergency button and the actuation means are mounted internally and externally on the door for operation of the door from inside and outside.

In an embodiment of the invention the mechanism from said actuation means to the door locks and to the connection means comprise Bowden cable and/or Push-Pull-Rods.

BRIEF DESCRIPTION OF THE SEVERAL VIEWS OF THE DRAWINGS

The invention is outlined by way of examples shown in the following description with reference to the attached drawings.

FIG. 6 shows an isometric view of alternative actuation means with a frontal emergency button according to the invention;

FIG. 7 shows a cross sectional view of the alternative actuation means with a frontal emergency button according to FIG. 6; and FIG. 8 shows an exploded view of the actuation means with a frontal emergency button according to FIG. 6.

DETAILED DESCRIPTION OF THE INVENTION

Figure 1:
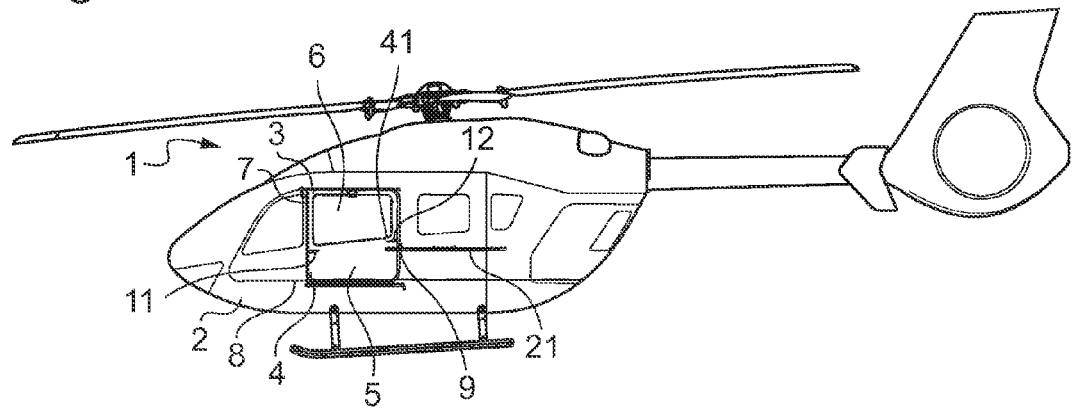
FIG. 1 shows a view of an aircraft with a door with a jettison mechanism according to the state of the art.

According to FIG. 1 a helicopter 1 as an aircraft is provided with an airframe 2. An upper guide rail 3 and a lower guide rail 4 are mounted parallel to each other and longitudinally along an outside of the airframe 2. A movably sliding door 5 with a window 6 is held with upper hinges 7 of connection means in the upper guide rail 3 and with lower hinges 8 in the lower guide rail 4. The door 5 of FIG. 1 is longitudinally movably sliding. The door 5 is lockable to the airframe 2 by a door lock mechanism 9 at an interface of said at least one door 5 with the airframe 2 to releasable lock the at least one door 5 to the airframe 2.

The actuation means comprise handles 11/12. On FIG. 1, the door 5 has a frontal handle 11 that is outside the door 5. On FIG. 2, the door 5 has a frontal handle 11 and a handle 12 that are both inside the door 5. When opening the door 5 by one handle 11/12, for actuation of the door lock mechanism 9, the door 5 is moved in curved guide rails 21 relative to the airframe to allow exit from or access to the inside of the airframe 2 of the helicopter 1. On FIG. 1, the outside handle 11 has an aerodynamic cover 41, which is external.

Figure 2:
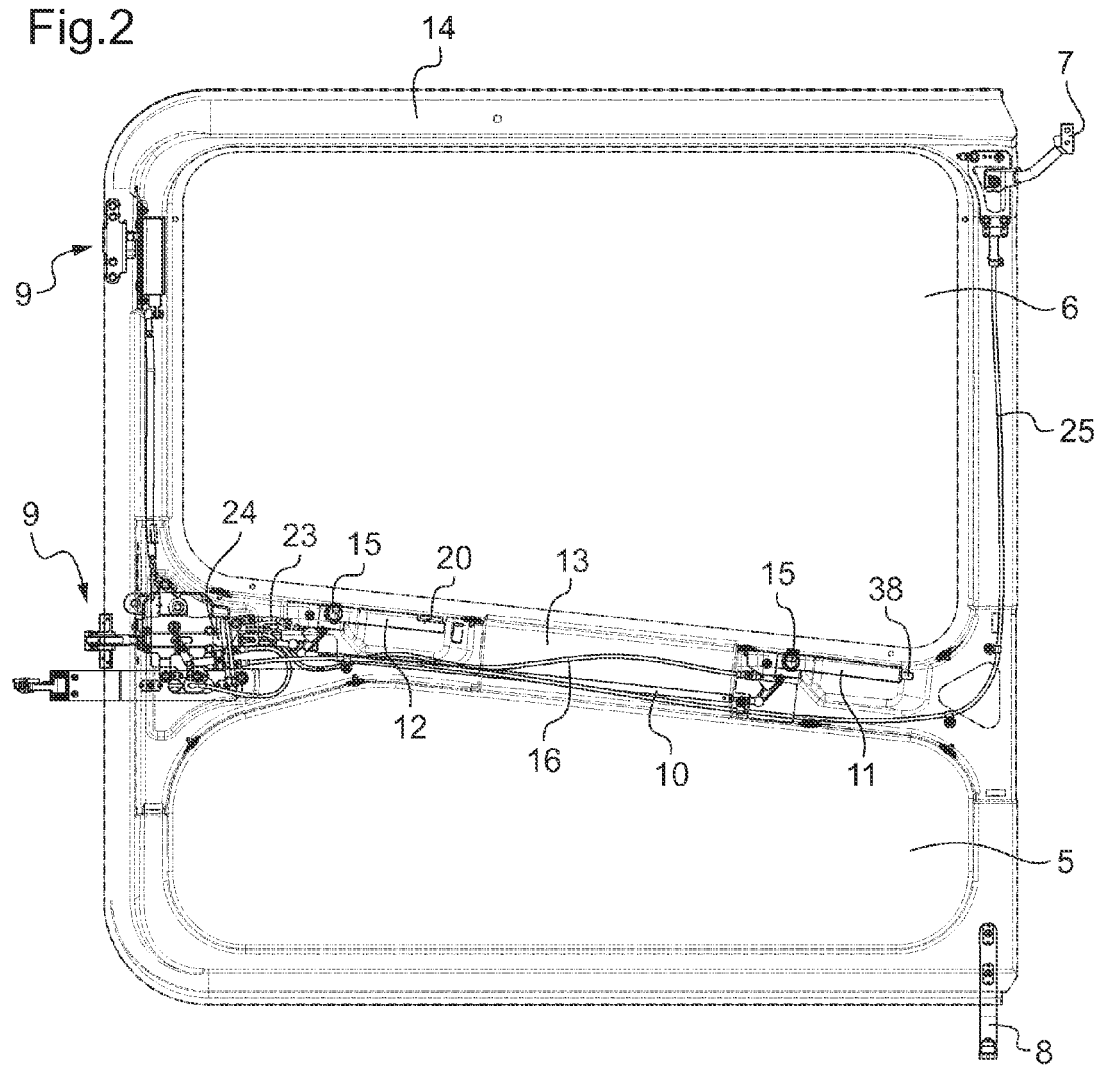
FIG. 2 shows an overall view to the inside of a door of an aircraft with a jettison mechanism according to the invention.

According to FIG. 2 corresponding features are referred to with the references of FIG. 1. Two handles 11, 12 of the actuation means are provided separately inside on the door 5 at a lower frame 13 below the window 6. The handles 11, 12 are respectively mounted on shafts 15, rotatable held at the lower frame 13, said shafts 15 connecting the handles 11, 12 to the actuation means for the door lock mechanism 9 of the door 5. An unlocking cam and shaft system/push-pull rod 10 mechanically connects each of the handles 11, 12 via the rotatable shafts 15 of the actuation means to the door lock mechanism 9 of the door 5. With the handles 11, 12 aligned to the frame 13 of the window, the door lock mechanism 9 is closed. If one or all of the handles 11, 12 are pulled upwards for rotation around the shafts 15, the door lock mechanism 9 is opened.

Each of the handles 11, 12 for the door lock mechanism 9 are provided with a respective emergency buttons 20, 38 for activation of a jettison mechanism, i.e., for separation of at least one of the hinges 7 from the upper guide rail 3 in order to sever the door 5 from the airframe 2. The lower hinge 8 falls out of the lower guide rail 4 due to gravity once the upper hinges 7 are free from the upper guide rail 3.

A severing Bowden cable 16 mechanically connects the frontal handle 11 to a mechanical unit 24 and a further severing Bowden cable 23 mechanically connects the handle 12 to the mechanical unit 24. From the mechanical unit 24 a Bowden cable 25 of the connection means leads to the upper hinge 7 of the jettison mechanism, said Bowden cable 25 transmitting the inputs from either the severing Bowden cable 16 and/or the further severing Bowden cable 23 to the hinge 7.

Figure 3:
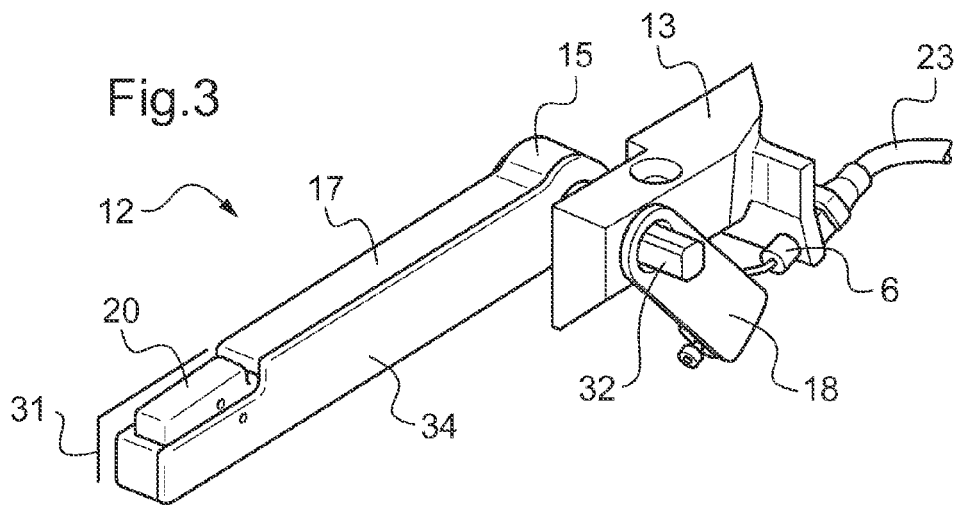
FIG. 3 shows a isometric view of the actuation means with an emergency button according to the invention.
Figure 4:
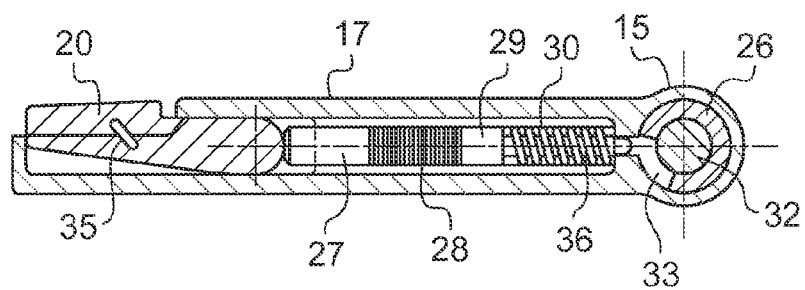
FIG. 4 shows a cross sectional view of the actuation means with an emergency button according to FIG. 3.
Figure 5:
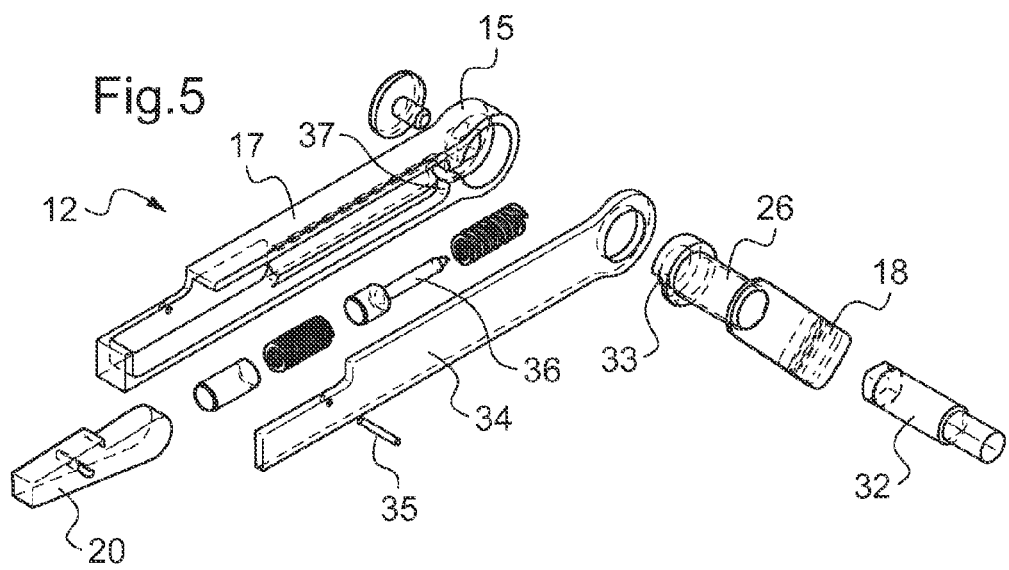
FIG. 5 shows an exploded view of the actuation means with an emergency button according to FIG. 3.

According to FIGS. 3-5 corresponding features are referred to with the references of FIG. 1, 2. The handle 12 is provided with a handle casing 17 mounted on the shaft 15 rotatable held in the lower frame 13. A lever 18 is mounted on a hollow shaft 26, said hollow shaft 26 being mounted coaxial to the rotation axis of the shaft 15 with one end in the handle casing 17. The further severing Bowden cable 23 is actuated by the lever 18 mounted on the hollow shaft 26.

Coaxially inside the hollow shaft 26 is provided a central shaft 32 for rotation with the handle casing 17. Said central shaft 32 is driven with the shaft 15 and is projecting beyond the hollow shaft 26. The unlocking push-pull rod 10 is connected to the central shaft 32. Upon pulling up the handle 12 for rotation around the shaft 15, the central shaft 32 is turned to pull the unlocking push-pull rod 10 and subsequently the door opening mechanism 9 is actuated.

The hollow shaft 26 is provided with a notch 33 at its periphery inside the handle casing 17, said notch 33 pointing towards the emergency button 20. The hollow shaft 26 is rotatable relative to the shaft 15 and the handle casing 17.

The emergency button 20 is provided at an open upper side of the door handle casing 17 distal to the shaft 15. The upper side is directed towards the upper frame 14. Inside the handle casing 17 are a block 27, a spring 28, a pin 29 and a further spring 30 all lined up coaxially towards the shaft 15. The handle casing 17 is provided with a lateral cover 34 for insertion of the emergency button 20, the block 27, the spring 28, the pin 29 and the further spring 30.

The emergency button 20 is fixed with a pintle 35 through the lateral cover 34 to the door handle casing 17 distal to the shaft 15. The pin 29 is provided with a tip 36 extending through the further spring 30 towards the notch 33 at the periphery of hollow shaft 26. The tip 36 is adapted for entry into the notch 33. The further spring 30 is supported by an abutment 37 inside the door handle casing 17, said further spring 30 urging the pin 29 away from the shaft 15 towards the emergency button 20.

The emergency button 20 is covered with a protective cap forming a quick removal cover 31, set on the handle casing 17. The protective cap has to be removed to gain access for actuation of the emergency button 20.

Method to operate the jettison via handle 12 is described.

If the emergency button 20 is pushed into the door handle casing 17, the emergency button 20 slides and is locked inside the door handle casing 17 towards the shaft 15. The emergency button 20 compresses spring 28 via block 27 and further compresses spring 30 by pushing pin 29 towards the shaft 15 and into the notch 33 at the periphery of the hollow shaft 26. With the pin 29 inserted into the notch 33, the shaft 15 is locked to the hollow shaft 26. If the handle 12 is pulled up and rotated around the shaft 15 with the pin 29 inserted into the notch 33, the hollow shaft 26 is rotated with the lever 18. The lever 18 further moves the severing Bowden cable 23 to mechanically transmit the rotation of the handle 12 to the mechanical unit 24 and via Bowden cable 25 of the connection means to the hinge 7 of the jettison mechanism.

The further spring 30 prevents unintentional engagement of the pin 29 when the emergency button 20 is not pushed.

According to FIGS. 6-8 corresponding features are referred to with the references of FIGS. 1-5. A frontal handle 11 is provided with the handle casing 17 mounted on the shaft 15 rotatable held in the lower frame 13. The lever 18 is mounted on the hollow shaft 26. The hollow shaft 26 is mounted coaxial to the rotation axis of the shaft 15 with one end in the handle casing 17. A severing Bowden cable 16 is actuated by the lever 18 mounted on the hollow shaft 26.

Coaxially inside the hollow shaft 26 is provided the central shaft 32 for rotation with the handle casing 17. Said central shaft 32 is driven with the shaft 15 and is projecting beyond the hollow shaft 26. The unlocking push-pull rod 10 is connected via an unlocking lever 19 to the central shaft 32. Upon pulling up the frontal handle 11 for rotation around the shaft 15, the central shaft 32 is turned to pull the unlocking push-pull rod 10 and subsequently the door opening mechanism 9 is actuated.

The hollow shaft 26 is provided with the notch 33 at its periphery inside the handle casing 17, said notch 33 pointing towards a frontal emergency button 38. The hollow shaft 26 is rotatable relative to the shaft 15 and the handle casing 17.

The frontal emergency button 38 is mounted into the door handle casing 17 through a circular opening 39 at a front side of the door handle casing 17 distal to the shaft 15. Inside the handle casing 17 are the pin 29 and the further spring 30 aligned coaxially towards the shaft 15. The handle casing 17 is provided with a lateral cover 34 for insertion of the frontal emergency button 38, the pin 29 and the further spring 30.

The frontal emergency button 38 is withheld by a cube 40 in the door handle casing 17 distal to the shaft 15. The pin 29 is provided with the tip 36 extending through the further spring 30 towards the notch 33 at the periphery of hollow shaft 26. The tip 36 is adapted for entry into the notch 33. The further spring 30 is supported by the abutment 37 inside the door handle casing 17, said further spring 30 urging the pin 29 away from the shaft 15 towards the frontal emergency button 38.

The frontal emergency button 38 is covered with a protective cap forming a quick removal cover 31, set on the handle casing 17. The protective cap has to be removed to gain access for actuation of the frontal emergency button 38.

Method to operate the jettison via frontal handle 11

If the frontal emergency button 38 is pushed the frontal emergency button 38 is slid inside the door handle casing 17 towards the shaft 15 compressing further spring 30 by pushing pin 29 towards the shaft 15 and into the notch 33 at the periphery of hollow shaft 26. With the pin 29 inserted into the notch 33 the shaft 15 is locked to the hollow shaft 26. If the frontal handle 11 is pulled up and rotated around the shaft 15 with the pin 29 inserted into the notch 33, the hollow shaft 26 is rotated with the lever 18 and severing Bowden cable 16, to mechanically transmit the rotation of the frontal handle 11 to the mechanical unit 24 and via Bowden cable 25 of the connection means to the hinge 7 of the jettison mechanism.

The further spring 30 prevents unintentional engagement of the pin 29 when the frontal emergency button 38 is not pushed.

LIST OF REFERENCES

| | |
|---|---|
| 1 | Aircraft |
| 2 | Airframe |
| 3 | Upper guide rail |
| 4 | Lower guide rail |
| 5 | Door |
| 6 | Window |
| 7 | Upper hinge |
| 8 | Lower hinge |
| 9 | Normal Door lock mechanism |
| 10 | Unlocking push-pull rod |
| 11 | Frontal handle |
| 12 | Handle |
| 13 | Lower frame |
| 14 | Upper frame |
| 15 | Shaft |
| 16 | Severing Bowden cable |
| 17 | Handle casing |
| 18 | Lever shaft |
| 19 | Unlocking lever |
| 20 | Emergency button |
| 21 | Curved guide rail |
| 22 | Frontal emergency button |
| 23 | Further severing Bowden cable |
| 24 | Mechanical unit |
| 25 | Bowden cable |
| 26 | Hollow shaft |
| 27 | Block |
| 28 | Spring |
| 29 | Pin |
| 30 | Further spring |
| 31 | Quick Removal cover |
| 32 | Central shaft |
| 33 | Notch |
| 34 | Lateral cover |
| 35 | Pintle |
| 36 | Tip |
| 37 | Abutment |
| 38 | Frontal emergency button |
| 39 | Circular opening |
| 40 | Cube |
| 41 | Aerodynamic cover |

What is claimed is:

1. An aircraft with jettison mechanism, comprising:
   an airframe;
   at least one door with connection means comprising at least one of a guide arm and a hinge to movably mount the door to the airframe;
   at least one door lock mechanism mounted to the door at an interface of the door with the airframe to releasably lock the door to the airframe; and
   actuation means comprising at least one handle mounted to the door for actuation of the door lock mechanism;
   at least one emergency button integrated in and moveable relative to the handle, the emergency button in communication with the connection means to jettison the door from the aircraft upon actuation by severing all connections of the door to the airframe;
   wherein the handle has a hollow casing, a pin and a spring disposed inside the hollow casing; the pin being mounted to slide relative to the handle upon actuation of the emergency button against the spring; and the emergency button being for activation of the pin for completely separating at least one of the guide arm and the hinges of the connection means from the airframe for jettisoning of the door.

2. The aircraft according to claim 1, wherein the handle comprises a protective cover and the emergency button is behind the protective cover.

3. The aircraft according to claim 1, wherein the actuation means comprises at least one of: an internal handle and an external.

4. The aircraft according to claim 3, wherein the external handle has an aerodynamic cover.

5. The aircraft according to claim 1, wherein the emergency button is connected to the actuation means of the connection means, from the handle to the connection means by at least one of: a Bowden cable or push-pull-rod.

6. The aircraft according to claim 1, wherein the handle casing is provided with a lateral cover for insertion of the emergency button, the pin and the further spring.

7. The aircraft according to claim 1, wherein the aircraft is a helicopter.

8. An aircraft comprising:
   an airframe;
   a door connected to the airframe by a hinge to move the door relative to the airframe between an opening position and a closed position;
   a door lock mechanism mounted to the door to releasably lock the door to in the closed position;
   a handle mounted to the door for actuation of the door lock mechanism; and
   an emergency button disposed on the handle and movable relative to the handle, the emergency button in communication with the hinge when actuated,
   wherein actuation of the emergency button operatively connects the handle to the hinge so that actuation of the handle unlocks the door lock mechanism and separates the hinge from at least one of the door and the airframe to jettison the door from the aircraft, thereby completely separating the door from the airframe.

9. The aircraft according to claim 8 wherein the handle is mounted to rotate about a shaft, wherein rotating the handle about the shaft actuates the door lock mechanism.

10. The aircraft according to claim 8 further comprising a pin and a spring disposed inside a handle casing, the pin mounted to slide relative to the handle casing between first and second positions in response to actuation of the emergency button against the spring, wherein when emergency button moves the pin to the second position, the handle is operatively connected to the hinge.

11. The aircraft according to claim 10 wherein further comprising a jettison linkage connected to the hinge, wherein in the first position the handle is not connected to the hinge, and in the second position, the handle is operatively connected to the hinge via the linkage.

12. The aircraft according to claim 11 wherein the jettison mechanism further comprises at least one of a cable and a push-pull rod operatively connected between the handle and the hinge, wherein rotation of the handle moves the at least one of the cable and the push-pull rod to separate the hinge from the at least one of the door and airframe.

13. The aircraft according to claim 11 wherein the jettison mechanism further comprises a second shaft mounted coaxially with the handle shaft, wherein the second shaft is locked to the handle shaft when the pin is in the second position.

14. The aircraft according to claim 8 further comprising a protective cover removeably mounted on the handle, wherein the emergency button is covered by the protective cover, wherein actuation of the button requires the protective cover to be removed.

15. An aircraft comprising:
   an airframe;
   a door connected to the airframe by a hinge to move the door relative to the airframe between an opening position and a closed position;
   a door lock mechanism mounted to the door to releasably lock the door in the closed position;
   a handle mounted to rotate on a handle shaft, wherein rotating the handle and thereby the handle shaft actuates the door lock mechanism; and
   a door jettison mechanism comprising:
      an emergency button disposed on the handle and movable relative a casing of the handle;
      a pin and a spring disposed inside the handle casing, the pin mounted to slide relative to the handle casing between first and second positions in response to actuation of the emergency button against the spring;
      a linkage operatively connected to the hinge, wherein when the pin is in the second position, the handle is operatively connected to the hinge via the linkage,
   wherein actuation of the emergency button with rotation of the handle unlocks the door and separates the hinge from at least one of the door and the airframe, thereby completely separating the door from the airframe allowing the door to be jettisoned from the aircraft.

16. The aircraft according to claim 15 wherein the linkage further comprises a second shaft mounted coaxially with the handle shaft, wherein the second shaft is locked to the handle shaft when the pin is in the second position.

17. The aircraft according to claim 16 wherein the linkage further comprises a cable operatively connected between the second shaft and the hinge, wherein rotation of the second shaft moves the cable to separate the hinge from the at least one of the door and airframe.

18. The aircraft according to claim 16 wherein the linkage further comprises a push-pull rod operatively connected between the second shaft and the hinge, wherein rotation of the second shaft moves the push-pull rod to separate the hinge from the at least one of the door and airframe.

19. The aircraft according to claim 15 wherein the second shaft comprises a notch formed along a periphery, the pin engaging the notch when the pin is in the second position.

20. The aircraft according to claim 15, further comprising a protective cover removeably mounted on the handle casing, wherein the emergency button is covered by the protective cover, wherein actuation of the button requires the protective cover to be removed.

* * * * *